Oct. 27, 1959            P. SMITH            2,909,885
BATTERY POWERED DISK TYPE LAWN MOWER
Filed May 21, 1958
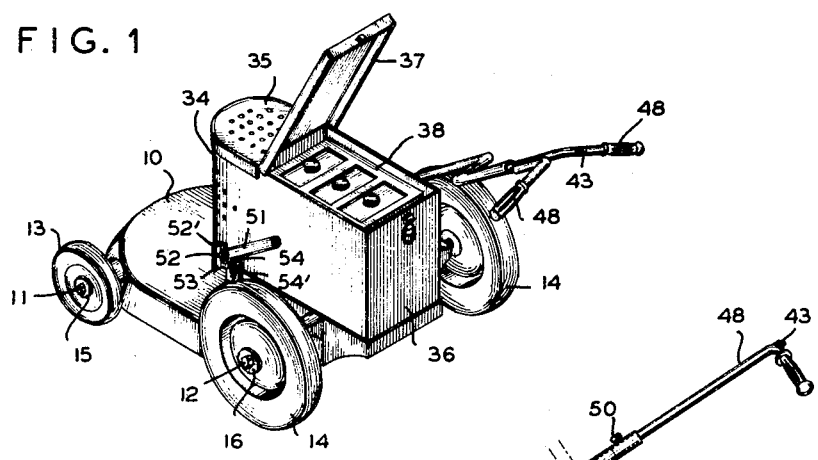
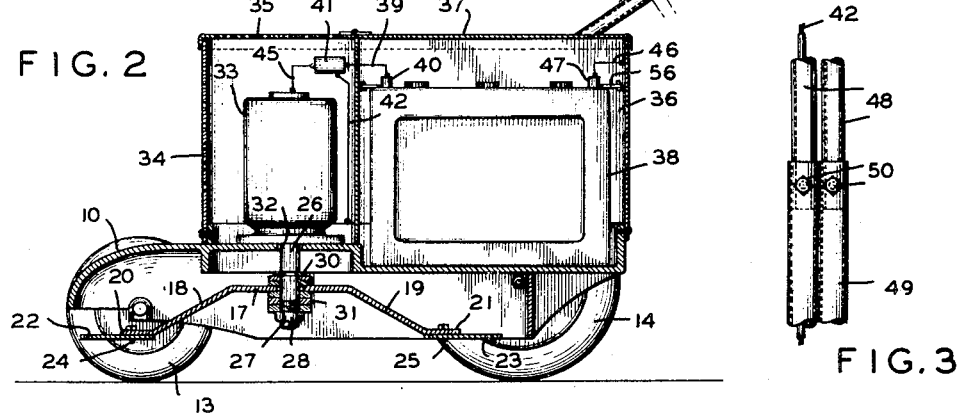
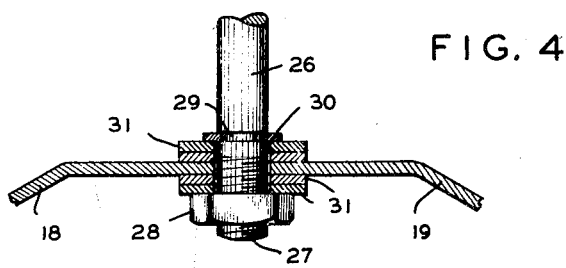
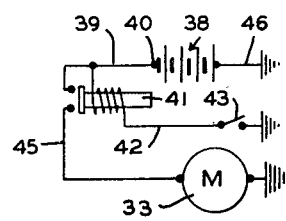
INVENTOR
PHILIP SMITH
BY *A. Yates Dowell*
ATTORNEY ial No. 736,895

United States Patent Office 2,909,885
Patented Oct. 27, 1959

2,909,885

BATTERY POWERED DISK TYPE LAWN MOWER

Philip Smith, Kissimmee, Fla.

Application May 21, 1958, Serial No. 736,895

1 Claim. (Cl. 56—25.4)

This invention relates to the care of lawns and the like, to equipment employed in such care, and more particularly to a battery-powered disk-type lawn mower, and is an improvement over that disclosed in my Patent No. 2,702,448, granted February 24, 1955.

The present invention is directed specifically to lawn mowers used around homes with small lawns which lawn mowers are relatively small in size and relatively easy to operate by various members of the family including housewives.

It is an object of the invention to provide a lawn mower which is more compact, in which the weight is distributed to reduce the amount of effort required to operate, in which the parts are designed for more positive cutting, and in which the blade is guarded and attached in a way to allow slippage when such blade encounters an obstruction to avoid damage to the blade or to the object encountered.

Another object of the invention is to provide an extensible handle having limit stops, a shorter motor shaft so that the distance between the motor and the cutting blade is reduced and with simple means for adjusting the height of the cutting blade in accordance with the length of the grass or other growth to be cut.

Other objects and advantages of the invention will be apparent from the following description taken in conjunction with the accompanying drawing in which:

Fig. 1 is a perspective of one application of the invention;

Fig. 2, an enlarged lengthwise vertical section;

Fig. 3, an enlarged fragmentary detail of the handle;

Fig. 4, an enlarged fragmentary detail of the friction clutch connection between the blade and the shaft disclosing also the manner in which the height of the blade is adjusted; and Fig. 5, a wiring diagram of the invention.

Briefly stated, the invention comprises a housing or shell including a circular portion in which the cutting blade operates. The housing is supported by front and rear wheels on suitable axles, the front wheels being relatively small and the rear wheels preferably larger. The housing is provided with spaced lugs disposed equally distantly from the axis of the cutter blade to which lugs the spaced ends of a handle are pivotally connected, such handle being extensible to accommodate operators of varying stature.

A cutter bar is mounted by means of a series of washers or friction plates which are bound against opposite sides of the cutter blade by a nut threaded on the end of a motor shaft and acting in conjunction with a fixed abutment on the motor shaft. The cutter bar is bent angularly from the central attaching portion at each side in angular arms which terminate in a plane axially offset from such central attaching portion to make it possible to use a shorter motor shaft which extends upwardly through the housing for the cutter bar, the motor being mounted above the housing, and behind which as close as possible to the motor and the cutter is a compartment for a storage battery located over the rear shaft of the mower for the advantage in the support thereof.

With continued reference to the drawing, a housing or shell 10 of generally circular shape is mounted on two pairs of cap screws 11 and 12 threaded into the housing 10 and supported by two pairs of wheels 13 and 14, held thereon by means of set screws 15 and 16, no axle or shaft being located in the shell 10 to create pockets for grass and weeds.

The sides of the housing or shell 10 provide a guard for a cutting blade having a central perforated mounted portion 17 with angular depending portions or arms 18 and 19 and end portions 20 and 21 to which are attached cutting tips 22 and 23 secured by fasteners 24 and 25 to the cutting blade.

Due to the angular portions 18 and 19 the cutting tips 22 and 23 are axially offset from the mounting portion 17 so that a shorter motor shaft may be employed. The arms of the cutter bar are slightly twisted so that they will elevate by suction grass or other growth being cut and cause the same to enter the path of the cutting tips to facilitate cutting and to mulch or comminute grass, leaves and the like.

A motor shaft 26 has a threaded end 27 for the reception of a nut 28 and the shaft is provided with a groove 29 in which is received a collar 30 to form a fixed abutment against which the nut 28 will bind the central or mounting portion 17 of the cutter and a series of thrust washers or disks 31. The arrangement of these disks determines the elevation of the cutter depending upon the number of disks above and below the mounting portion 17 and they also provide a friction clutch or connection so that when an obstruction is encountered the cutter may slip to prevent damage thereto or to the obstruction.

The motor shaft 26 is relatively short and extends upwardly through an opening 32 to a low voltage motor 33 located above the housing within a vented casing 34 having a pivoted cover 35. Contiguous to the casing 34 is a casing 36 having a hinged cover 37 and within this casing is adapted to be contained a wet cell battery 38 for driving the motor 33.

The casing 36 for the battery 38 is located directly above the rear axle 12 in order that minimum effort will be required in controlling the direction of the mower and for propelling the same. Lead 39 extends from the terminal 40 of the battery 38 to a solenoid switch 41. Lead 42 extends from the solenoid switch 41 to a control switch 43 on the upper portion of the handle and the other side of switch 43 is grounded through the handle back to the housing 10 to complete the switch circuit. Lead 45 extends from the open side of the solenoid switch 41 to the motor 33 to supply current to the motor when the solenoid switch is closed. The motor is grounded to the housing 10 and the battery casing 36 and both circuits are completed by the lead 46 which extends from the casing 36 to the battery terminal 47.

The mower has an extensible handle including handle-bars 48 which extend into tubes 49 and are fastened therein by means of a set screw 50. The lower extremities 51 of the handle are secured by bolts 52 and friction washer 52' which provide a positive ground connection to the housing 10 through upstanding lugs 53 mounted on the housing 10. The lugs 53 limit the forward motion of the handle and screws 54 adjustably mounted in lug 54' attached to the housing 10 rearwardly of the lugs 53 limit the lowering of the handle.

In the operation of the device a six or twelve volt battery is mounted in the casing 36 and is secured in place by clamps 56. The terminal leads are connected to the battery, the height of the cutter bar is adjusted and the switch on the handle is pressed which closes the circuit from the battery to the motor whereupon the device may be pushed over the lawn to mow the grass or the growth.

As long as the operator holds the switch 43 in closed position the battery will supply power to the motor, but if for any reason the operator releases the switch the circuit will be broken.

It will be obvious to those skilled in the art that various changes may be made in the invention without departing from the spirit and scope thereof and therefore the invention is not limited by that which is illustrated in the drawing and described in the specification, but only as indicated in the accompanying claim.

What is claimed is:

A battery powered lawn mower comprising a shell defining a protective compartment for a rotating cutter, wheels supporting said shell at the front and the rear, said shell providing a direct support for a motor and a storage battery, a motor and a storage battery mounted on said shell in closely associated relation, a housing mounted on said shell enclosing said motor and battery, the motor having a shaft extending through said shell and with its lower extremity terminating above the lower edge of said shell, said storage battery being located directly over the axis of the rear wheels, a cutter blade fixed to said shaft and having terminal cutting elements adjacent the lower edge of said shell.

References Cited in the file of this patent

UNITED STATES PATENTS

| | | |
|---|---|---|
| 2,592,755 | Soenksen | Apr. 15, 1952 |
| 2,702,448 | Smith | Feb. 22, 1955 |
| 2,721,438 | O'Maley | Oct. 25, 1955 |
| 2,724,229 | Graham | Nov. 22, 1955 |
| 2,760,327 | Bovee | Aug. 28, 1956 |
| 2,779,147 | Musgrave | Jan. 29, 1957 |
| 2,825,196 | Gudmundsen | Mar. 4, 1958 |